(12) United States Patent
Saitou et al.

(10) Patent No.: US 6,701,800 B2
(45) Date of Patent: Mar. 9, 2004

(54) PEDAL SUPPORT STRUCTURE FOR VEHICLE

(75) Inventors: Osamu Saitou, Tokyo (JP); Hitoshi Harashima, Tokyo (JP); Masashi Ishida, Tokyo (JP); Yasunori Sugita, Tokyo (JP); Hirokazu Chosho, Tokyo (JP); Tatsuya Okuno, Tokyo (JP); Masafumi Kotani, Tokyo (JP); Hiroaki Maruyama, Tokyo (JP); Nozomu Sutou, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 76 days.

(21) Appl. No.: 10/162,569

(22) Filed: Jun. 6, 2002

(65) Prior Publication Data
US 2002/0184962 A1 Dec. 12, 2002

(30) Foreign Application Priority Data
Jun. 8, 2001 (JP) .................................... 2001-174681

(51) Int. Cl.[7] ................................................ G05G 1/14
(52) U.S. Cl. ........................ 74/512; 180/274; 280/784
(58) Field of Search ................ 74/512, 560; 180/274, 180/275; 280/750, 752, 784; 296/189

(56) References Cited

U.S. PATENT DOCUMENTS

| | | | | |
|---|---|---|---|---|
| 6,055,883 A | * | 5/2000 | Kato | 74/512 |
| 6,142,036 A | * | 11/2000 | Mizuma et al. | 74/512 |
| 6,276,483 B1 | | 8/2001 | Sinnhuber et al. | 180/274 |
| 6,327,930 B1 | | 12/2001 | Ono et al. | 74/512 |
| 6,408,711 B1 | * | 6/2002 | Mizuma et al. | 74/512 |
| 2002/0070605 A1 | | 6/2002 | Ono | |
| 2002/0189391 A1 | | 12/2002 | Matsumoto et al. | |
| 2003/0056616 A1 | | 3/2003 | Matsumoto et al. | 74/512 |

FOREIGN PATENT DOCUMENTS

| | | | |
|---|---|---|---|
| DE | 39 04 616 | 8/1989 | |
| EP | 0 659 615 A1 | 6/1995 | |
| EP | 0 659 615 | 6/1995 | |
| EP | 0 847 900 | 6/1998 | |
| EP | 1074445 A2 * | 2/2001 | B60T/7/06 |
| JP | 10-512518 | 12/1998 | |
| JP | 11-43073 | 2/1999 | |
| JP | 11-59351 | 3/1999 | |
| JP | 2000-163146 | 6/2000 | |

OTHER PUBLICATIONS

Copy of USSN 10/170,685, filed Jun. 14, 2002.
Copy of USSN 10/170,705, filed Jun. 14, 2002.

* cited by examiner

Primary Examiner—Chong H. Kim
(74) Attorney, Agent, or Firm—Smith, Gambrell & Russell, LLP (57) ABSTRACT

A pedal support structure for use in a vehicle contains a toe board, a steering support beam, a master cylinder, a pair of pedal support elements including pedal support portions, a supporting mechanism provided between the pedal support portions supporting a pedal lever, and a catcher bracket. When an impact is applied to the vehicle, the pedal support portions are spread apart so as to disconnect the pedal lever from the pedal supporting mechanism and the movement of the pedal lever in a direction toward an operator of the vehicle is restricted by the pedal lever contacting the catcher bracket.

7 Claims, 8 Drawing Sheets

PEDAL SUPPORT STRUCTURE FOR VEHICLE

BACKGROUND OF THE INVENTION

1. Field of the Invention

The present invention relates to a pedal support structure for a vehicle, and particularly to a pedal support structure for supporting a brake pedal or a clutch pedal therefor at an optimum safe position without contacting passengers when the vehicle is collided in a forward direction.

2. Discussion of the Related Art

A brake pedal for an automobile is provided in front of a driver's seat in a passenger compartment. The brake pedal is composed of a pedal pad and a pedal lever, and is actuated by a driver. The brake pad is used as a step-on surface which the driver stamps. The pedal lever extends approximately in a vertical direction and has the pedal pad at a bottom end thereof. A top end of the pedal lever is supported on a pedal bracket so as to pivot thereon and the pedal bracket is fixed to a toe board. The toe board is a partition interposed between an engine room and the passenger compartment. In front of the toe board, a master cylinder is provided for amplifying the stepping force of the driver. The master cylinder and the pedal lever is linked with each other via a pushrod.

There is such a possibility that the brake pedal with the above-mentioned structure is moved backward, that is, in a direction toward a passenger when external force more than a predetermined value is applied to the vehicle from the front. In this case, the external force pushes a power unit backward, and the power unit pushes the master cylinder and the toe board toward the passenger compartment. Finally, the brake pedal supported by the pedal bracket is pushed backward.

Figure 8:
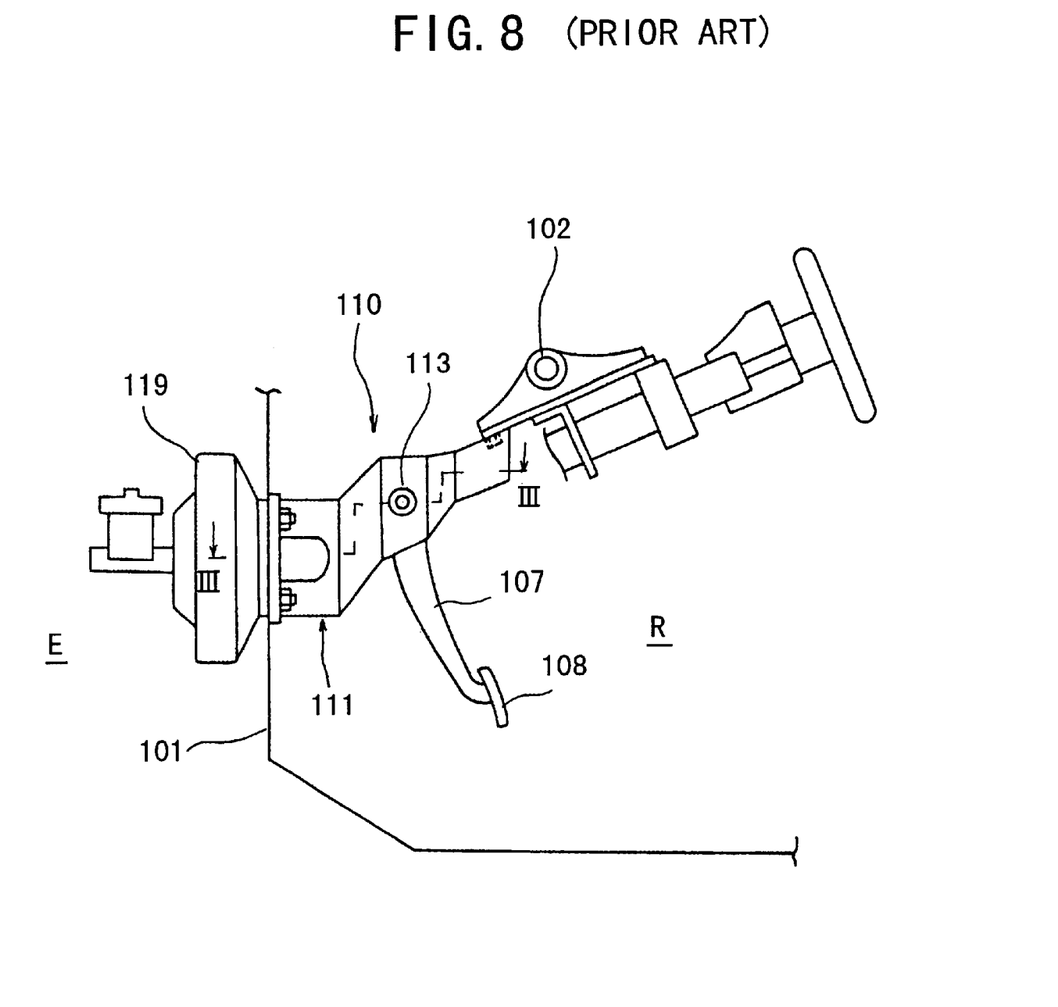
FIG. 8 is a view schematic side view for explaining a conventional pedal support structure.

As a countermeasure to eliminate such possibility, a pedal support structure is proposed in Japanese Kokai Publication 2000-163146. The pedal support structure is shown in FIG. 8 as a schematic diagram, and in FIG. 9 as a cross section of a part shown in FIG. 8 cut along III—III. A pedal bracket 110 has a pair of outer plates 111 which oppose with each other and an inner plate 115 which is interposed between the outer plates 111. Front parts of the outer plates 111 are attached to a toe board 101, and rear parts thereof are linked to a steering support beam 102. Each outer plate 111 has a convex portion at an intermediate position thereof. This shape of the outer plates 111 helps to enlarge the distance between the two intermediate positions when an external force exceeding a predetermined value is applied to the vehicle from the front. A circular opening 113 is perforated at the intermediate position of each outer plate 111.

Figure 9:
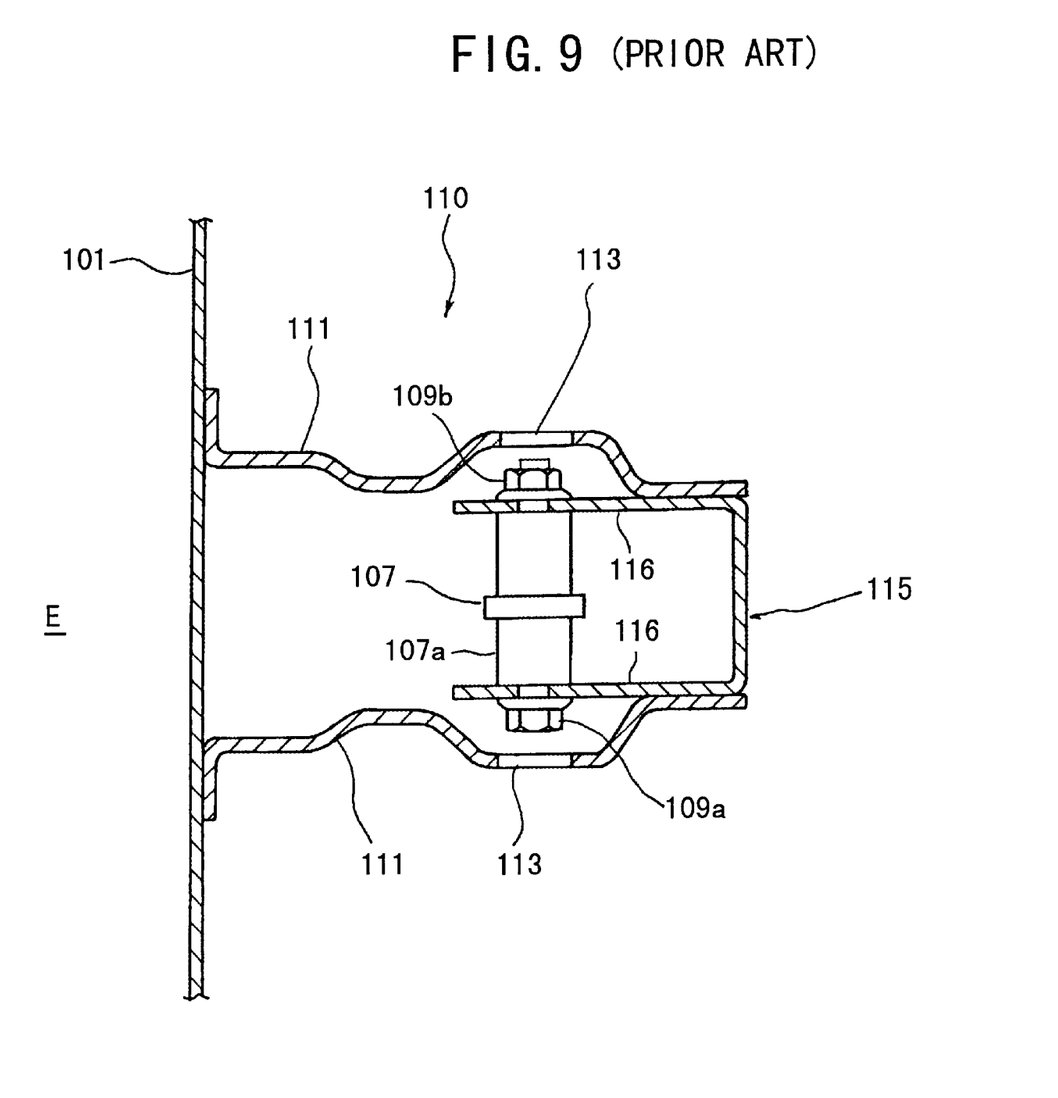
FIG. 9 is a cross section of a part shown in FIG. 8 cut along III—III.

The plan view of the inner plate 115 is approximately in a U shape by a plane view. By interposing the inner plate 115 between the outer plates 111, opposing walls 116 of the inner plate 115 are firmly fixed on the outer plates 111 by superimposing on each other on the side of the steering support beam 102. A boss 107a in the shape of a cylinder is prepared at the top end of a pedal lever 107. A bolt 109a as an axle is inserted into the boss 107a, and the boss 107a containing the bolt 109a is laid over both opposing walls 116. In this state, the bolt 109a is screwed with a nut 109b, whereby the boss 107a is supported by the inner plate 115. A master cylinder 119 is located in front of the toe board 101. The pedal lever 107 and the master cylinder 119 are connected with each other via a pushrod (not shown) which penetrates the toe board 101.

When an external force more than a predetermine value is applied to the vehicle from the front, the external force backwardly pushes a power unit (not shown) contained in an engine room E. Then, the power unit pushes the master cylinder 119 and the toe board 101 to the passenger compartment R side. Accordingly, the outer plate 111 begins to deform at the vicinity of the circular openings 113, and then the outer plates 111 are widely apart from each other. On the other hand, the inner plate 115 is not affected by the deformation of the outer plates 111, and keeps to support the pedal lever 107. In this way, the pedal support structure is so prepared to maintain the distance from a passenger to the pedal lever 107 and a pedal pad 108.

In the above-mentioned pedal support structure described in Japanese Kokai Publication 2000-163146, only the outer plates 111 are deformed, and the pedal lever 107 and the pedal pad 108 are prevented from moving backward by the inner plate 115 supporting the pedal lever 107.

However, when a still larger external force is applied to push the toe board 101 and the master cylinder 119 backward, there is such a possibility that the pushrod protruded from the master cylinder 119 pushes the pedal lever 107 backward, and that the pedal lever 107 pivots on the upper end of the pedal lever 107, whereby the pedal pad 108 is pushed up toward the passenger. The same can happen as to a clutch pedal.

OBJECT AND SUMMARY OF THE PRESENT INVENTION

It is therefore an object of the present invention to provide a pedal support structure for use in a vehicle which provides safety by preventing a pedal from moving in a direction toward a passenger compartment when an external force applied to a vehicle comprising a toe board; a steering support beam; a pedal lever with a first end and a second end; a master cylinder connected with the toe board; a pushrod extending from the master cylinder and having an end connected to the pedal lever; a pair of pedal support elements including pedal support portions opposing each other and extending in a lengthwise direction of a vehicle body, the pedal support element having a first end connected to the toe board and a second end connected to the steering support beam; a supporting mechanism provided between the pedal support portions for supporting the first end of the pedal lever thereon so as to permit pivotal movement of the pedal lever; and a catcher bracket having a free end facing the pedal lever, and the pedal support portions of the pedal support elements being spread apart when a force is applied to the vehicle so as to disconnect the pedal lever from the supporting mechanism, and movement of the pedal lever in a direction toward an operator of the vehicle being restricted by the pedal lever contacting the catcher bracket when the pedal lever is disconnected from the pedal supporting mechanism.

A second object of the present invention is to provide the pedal support structure for the vehicle by which the pedal support portions are certainly subjected to an opening deformation when an external force is applied from the front side of the vehicle wherein the pedal support elements successively comprise installation portions connected to the toe board; opposing portions opposing each other and extending from the installation portions; first inclination portions extending from the opposing portions having a first connection between the opposing portions and the first inclination portions; the pedal support portions extending from the first inclination portions having a second connection between the first inclination portions and the pedal support portions; second inclination portions extending from the pedal support portions having a third connection between the pedal support portions and the second inclination portions; and connecting portions extending from the second inclination portions having a fourth connection between the second inclination portions and the connecting portions, the connecting portions connected to the steering support beam; the pedal support elements being bent at the first connection, the second connection, the third connection and the fourth connection so as to have the first inclination portions gradually having a longer distance from each other towards the pedal support portions, and the second inclination portions gradually having a shorter distance from each other towards the connecting portions.

A third object of the present invention is to provide the pedal support structure for the vehicle by which the pedal is firmly supported on the pedal support portions by a simple structure that makes the braking operation comfortably performed, and a braking effect can be maintained for a relatively long time even by the detachment of the pedal lever from the shaft in the pedal support portions wherein the supporting mechanism comprises a shaft having engaging parts provided with serrations at both ends; the pedal support portions having supporting holes, the engaging parts pressed into the supporting holes and the first end of the pedal lever supported on the shaft so as to rotate therearound.

A fourth object of the present invention is to provide the pedal support structure for the vehicle by which the movement of the pedal lever toward the operator is effectively restricted wherein the catcher bracket has another end connected to the pedal bracket, the free end of the catcher bracket contacting the pedal lever when the pedal lever is detached, and the free end moveable downwardly to push the pedal lever in a downward direction.

A fifth object of the present invention is to provide the pedal support structure for the vehicle by which the pedal lever is pressed in a direction apart from the operator with a larger reliability wherein the pedal lever has a concave part at the second end which is engageable with the free end of the catcher bracket.

A sixth object of the present invention is to provide the pedal support structure for the vehicle by which the pedal lever is supported by the pedal support elements with an improved certainty and the pedal operation is comfortably performed in a normal condition, and opening deformation of the pedal support elements are certainly carried out and the catcher bracket is firmly supported and functions in an excellent way when an external force is applied to the vehicle from the front side of the vehicle, further comprising rigid support brackets having a larger rigidity than the pedal support elements, the pedal support elements connected to the steering support beam by the rigid support brackets, and the another end of the catcher bracket fixed on the rigid support brackets.

A seventh object of the present invention is to provide the pedal support structure for the vehicle by which an external force from the front side of the vehicle is received by the steering support beam which has a large rigidity, and the opening deformation of the pedal support bracket is surely performed with minimizing the load application to a bulkhead further comprising a bulkhead extending from an upper end of the toe board, a bulkhead bracket provided on the bulkhead, the bulkhead bracket having a bolt hole therein, the rigid support brackets having a bolt hole therein, the bulkhead bracket and the rigid support brackets connected by a bolt through the bolt hole in the rigid support bracket and the bolt hole in the bulkhead bracket, at least one of the bolt hole in the bulkhead and the bolt hole in the rigid support bracket having an oval shape with a longer axis in a lengthwise direction of the vehicle body.

BRIEF DESCRIPTION OF THE DRAWINGS

The present invention becomes better understood by reference to the following detailed description when considered in connection with the accompanying drawings, wherein.

DETAILED DESCRIPTION OF THE INVENTION

Other features of this invention will become understood by the following description of exemplary embodiments, which are given for illustration of the present invention and are not intended to be limiting thereof.

A pedal support structure for a vehicle of the present invention will be explained by referring to FIGS. 1 to 7 wherein a brake pedal for an automobile is used as an example. In the figures, an arrow F indicates a front direction with respect the automobile.

Figure 1:
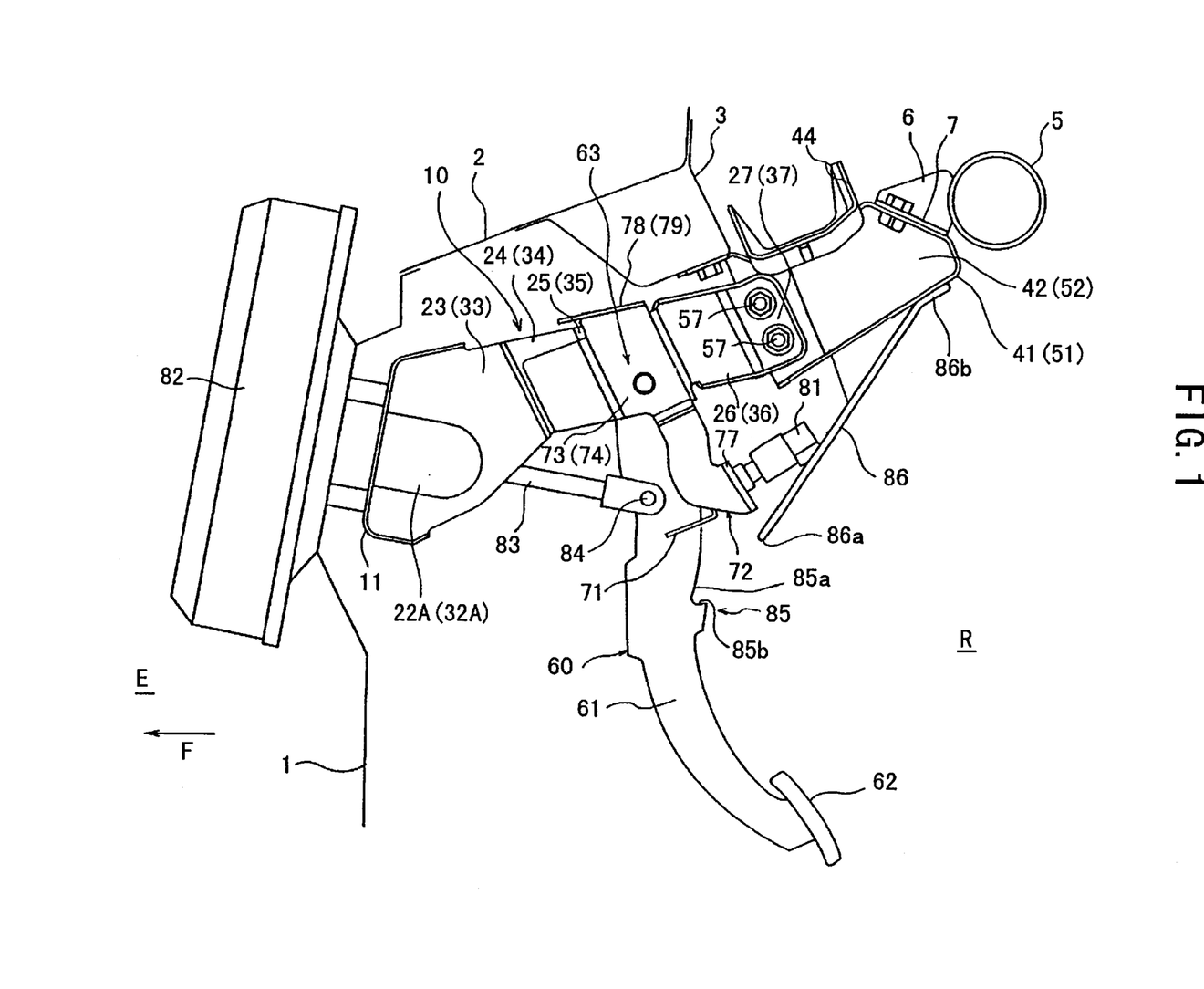
FIG. 1 is a schematic side view for explaining a pedal support structure of a brake pedal as an embodiment of the present invention.

FIG. 1 is a schematic side view for explaining a support structure for a brake pedal unit and related parts thereof. A reference numeral 1 indicates a toe board partitioning an engine room E and a passenger compartment R. Left and right lateral edges of the toe board 1 are connected to left and right front pillars (not shown). An upper edge and a lower edge of the toe board 1 are respectively connected to a bulkhead 2 extending in a widthwise direction of the automobile and a floor panel (not shown). A steering support beam 5 extends in the widthwise direction of the automobile over the left and right front pillars. The steering support beam 5 is a member having an extremely large rigidity which is sufficiently strong for supporting a steering column.

A pedal bracket 10 is provided in the lengthwise direction of the vehicle between the toe board 1 and the steering support beam 5 with an inclination by gradually getting higher from the front to the back.

The pedal bracket 10 will be further explained in detail with reference to FIGS. 1 to 5.

The pedal bracket 10 includes a front installation member 11, left and right pedal support brackets 21 and 31, and left and right rear side support brackets 41 and 51 as main parts.

The front installation member 11 is approximately in a rectangular shape, and any front face of the front installation member 11 is in contact with the toe board 1. The front installation member 11 is connected with the toe board 1 by bolts. The pedal support brackets 21 and 31 are provided so as to oppose each other, and the front parts of the pedal support brackets 21 and 31 are connected to the front installation member 11 by bolts. Furthermore, the front parts of the rear side support brackets 41 and 51 are connected with the rear parts of the pedal support brackets 21 and 31. The rear ends of the rear side support brackets 41 and 51 are supported by the steering support beam 5 via a support beam bracket 6.

Figure 3:
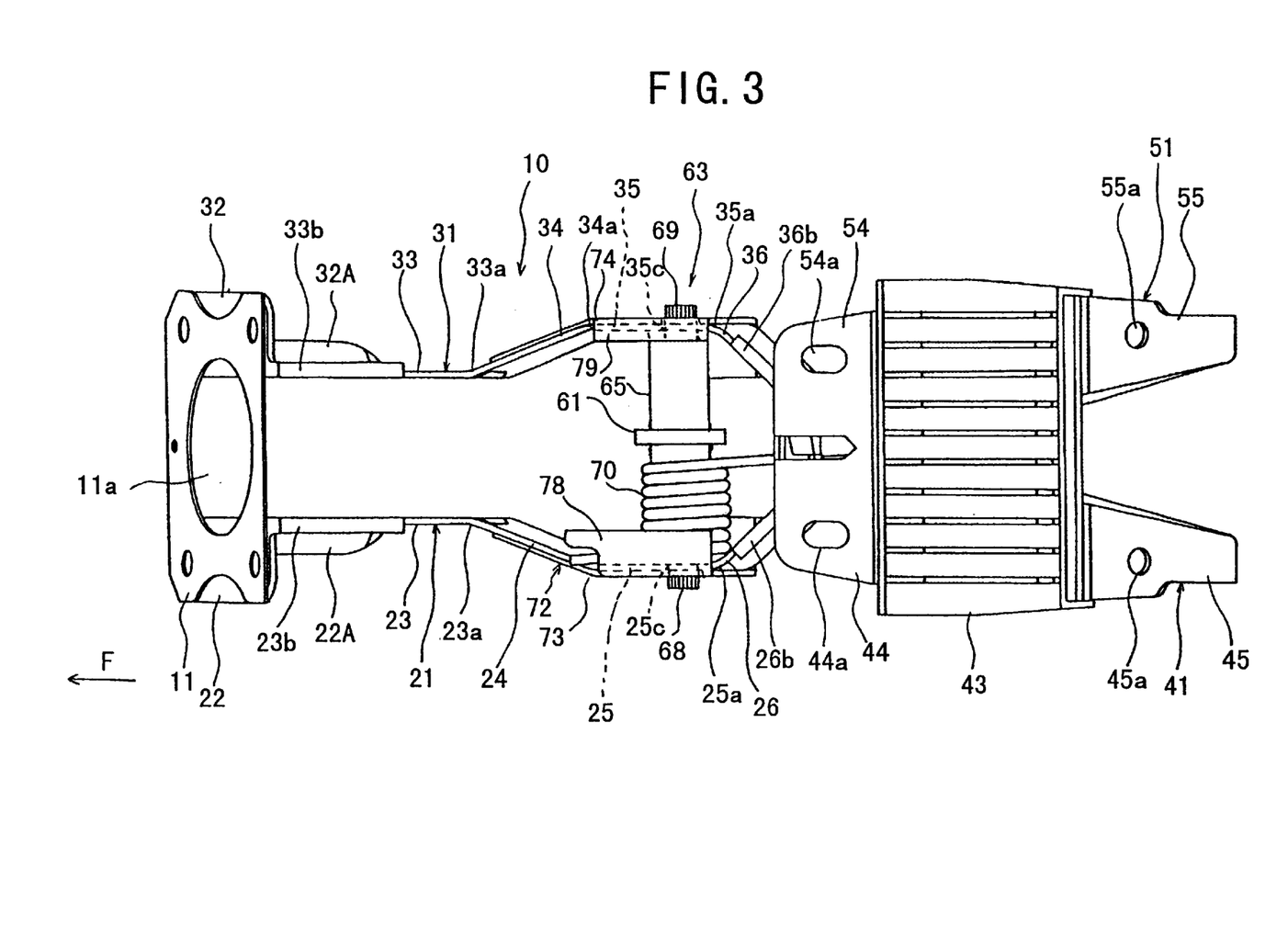
FIG. 3 is a plane view of the pedal support structure shown in FIG. 2.

The pedal support brackets 21 and 31 are made of a sheet metal. As shown in FIG. 3, the brackets 21 and 31 successively contain front opposing portions 23 and 33, front inclination portions 24 and 34, pedal support portions 25 and 35, rear inclination portions 26 and 36, and rear connecting portions 27 and 37.

More precisely, the front opposing portions 23 and 33 opposing each other are connected with a back surface of the front installation member 11 on the right and left sides. The pedal support brackets 21 and 31 extend in a lengthwise direction of the automobile by bending at rear ends of the front opposing portions 23 and 33. Following the rear ends of the front opposing portions 23 and 33, the front inclination portions 24 and 34 are provided. The front inclination portions 24 and 34 extend in a backward direction by bending along first bending lines 23a and 33a on lateral faces of the pedal support brackets 21 and 31. The front inclination portions 24 and 35 gradually separate from one another in a backward direction. The pedal support portions 25 and 35 extend from the rear ends of the front inclination portions 24 and 34 by the pedal support brackets 21 and 31 being bent along second bending lines 24a and 34a on the lateral sides thereof. The pedal support portions 25 and 35 are approximately in parallel with each other. The rear inclination portions 26 and 36 are provided following the rear ends of the pedal support portions 25 and 35, and extend in a backward direction. The pedal support brackets 21 and 31 are bent along third bending lines 25a and 35a on the lateral sides thereof. The rear inclination portions 26 and 36 are gradually coming close to each other in a backward direction. Finally, the pedal support brackets 21 and 31 are bent along fourth bending lines 26a and 36b on the lateral sides thereof, and the rear connecting portions 27 and 37 are formed so as to be approximately in parallel with each other.

The first bending lines 23a and 33a, the second bending lines 24a and 34a, the third bending lines 25a and 35a, and the fourth bending lines 26a and 36a cross the longitudinal direction of the pedal support brackets 21 and 31 approximately at a right angle, and are approximately in parallel with each other.

Figure 2:
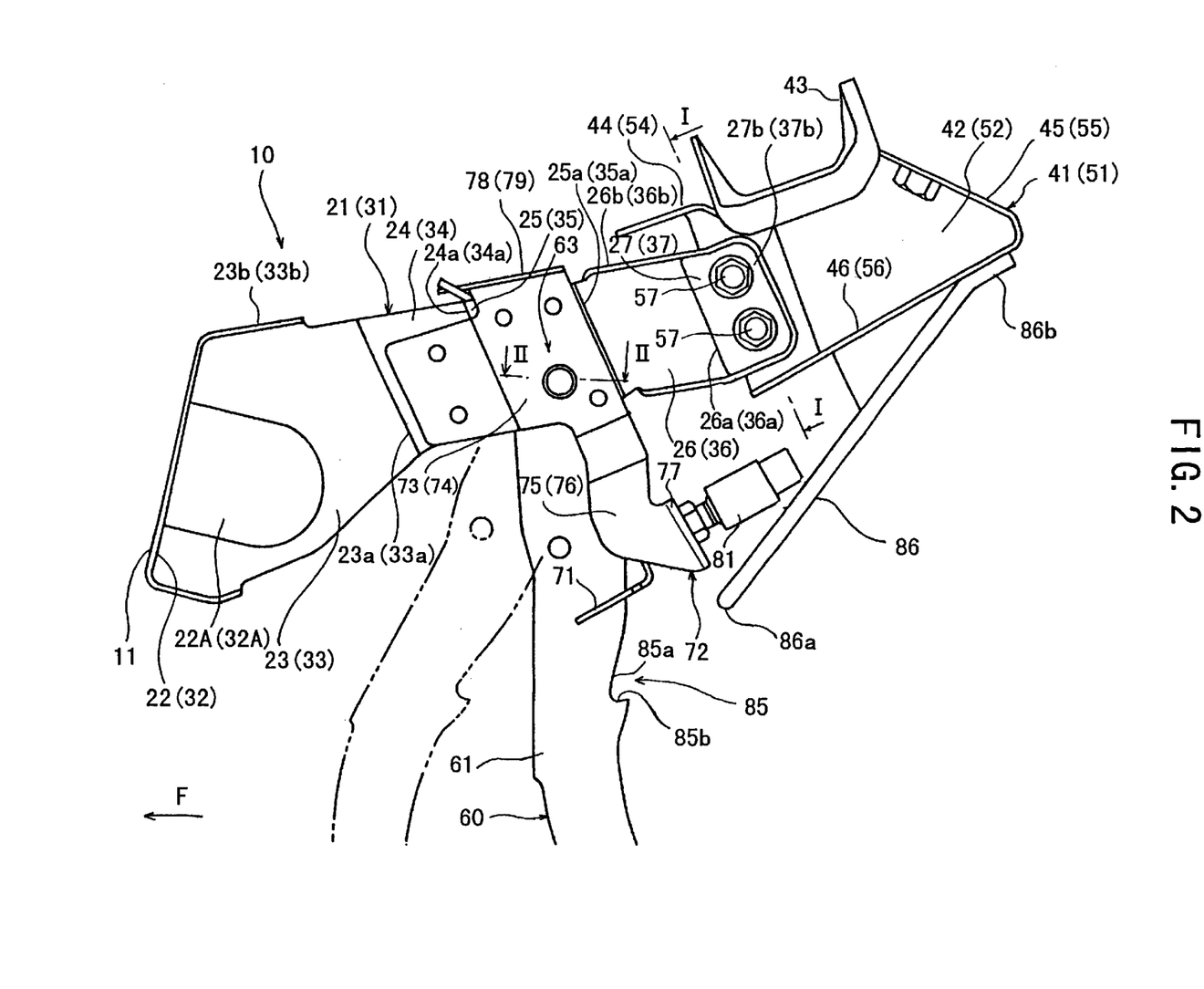
FIG. 2 is partial side view of the pedal support structure shown in FIG. 1.

As shown in FIGS. 1 to 3, beads 22A and 32A in swollen shapes extending in the longitudinal direction on the front installation portions 22 and 32 and front parts of the front opposing portions 23 and 33 for maintaining a firm connection of the front installation portions 22 and 32 and the front opposing portions 23 and 33. Reinforcing flanges 23b and 33b are provided on a top and bottom edges of the front opposing portions 23 and 33 by being bent to the lateral sides at the front parts thereof. The front ends of the reinforcing flanges 23b and 33b are connected to the front installation member 11. Reinforcing flanges 26b and 36b are provided on top and bottom edges of the rear inclination portions 26 and 36. Furthermore, reinforcing flanges 27b and 37b cover top, bottom and rear edges of the rear connecting portions 27 and 37. The front edges of the reinforcing flanges 27b and 37b are connected with the rear ends of the reinforcing flanges 26b and 36b.

Figure 4:
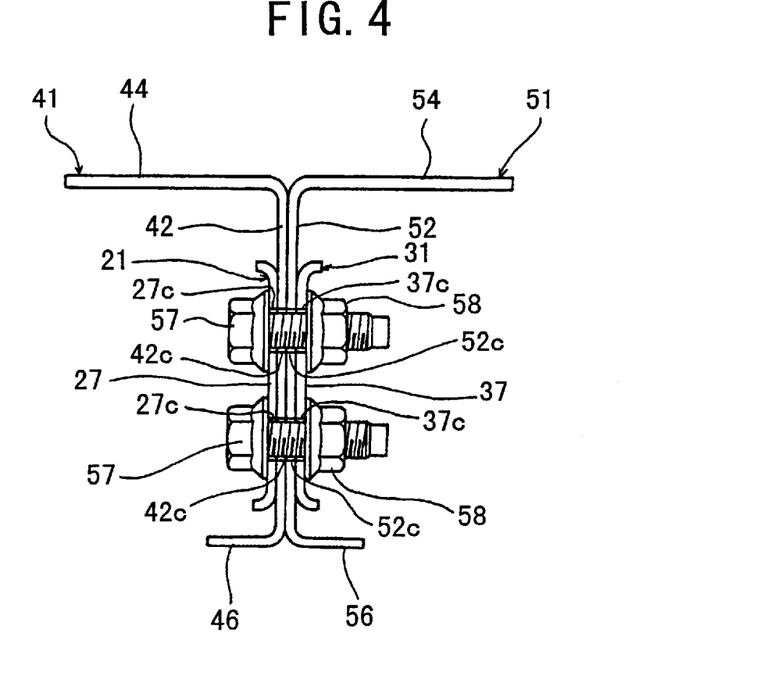
FIG. 4 is a cross section of a pedal axle supporting mechanism, as a part shown in FIG. 2 cut along I—I.

Left and right rear side support brackets 41 and 51 are made of the sheet metals. The rear side support brackets 41 and 51 are in the rectangular shapes having rear edges declined in a backward direction. The rear side support brackets 41 and 51 have base parts 42 and 52 with the rear edges gradually declined in a backward direction. On the base parts 42 and 52, a harness protector 53 made of a resin is provided for receiving harnesses hang down from an instrumental panel (not shown). Surfaces of the base parts 42 and 52 located below the harness protector 53 are in contact with each other (FIG. 4). Therefore, it is possible to prevent the harnesses from coming in contact with the pedal bracket 10, a brake pedal 60 and a pedal supporting mechanism 63 which will be explained below.

As shown in FIG. 3, bulkhead connecting portions 44 and 54 are prepared by bending at the upper front edge of the base parts 42 and 52. The bulkhead connecting portions 44 and 54 are approximately in the rectangular forms which extend to the front by bending. Bolt holes 44a and 54a in the form of ovals having longer diameters in the longitudinal direction of the bracket 10. Rear installation portions 45 and 55 in the shape of rectangles are connected to the rear ends of the bulkhead connection portions 44 and 54 by bending along the rear end of the harness protector 43. The rear installation portions 45 and 55 are in a U shape, and have bolt holes 45a and 55a. The rear side support brackets 41 and 51 contain reinforcing flanges 46 and 56 extending from the bottom edges of the rear installation portions 45 and 55 in a forward direction.

The rear side support brackets 41 and 51 have larger rigidity than the pedal support brackets 21 and 31 by the base parts 42 and 52 superimposed on each other. As shown in FIG. 1, a balk head bracket 3 is provided on a bulkhead 2, and is linked with bulkhead connecting portions 44 and 54 by a bolt and a nut. Rear walls of the rear installation portions 45 and 55 are in contact with an installation wall 7 of a support beam bracket 8 which is provided on a steering support beam 5. The rear side support brackets 41 and 51 are firmly supported on the bulkhead 2 and the steering support beam 5 by fastening bolts.

As shown in FIGS. 2 and 4, the rear connecting portions 27 and 37 of the pedal support brackets 21 and 31 are superimposed with the front portions of the base parts 42 and 52 contained in the rear side support brackets 41 and 51. Namely, the superimposed base parts 42 and 52 are interposed between the rear connecting portions 27 and 37. A pair of bolt holes 27c, 37c, 42c and 52c are perforated respectively on the rear connecting portions 27 and 37 and the base parts 42 and 52. Accordingly, the pedal support brackets 21 and 31 and the brackets 41 and 51 are firmly fixed by bolts 57 and nuts 58 inserted into the bolt holes 27c, 37c, 42c and 52c (FIG. 4).

A top end of a pedal lever 61 is supported on lower parts of the pedal supporting portions 25 and 35 so as to pivot in a pedal supporting mechanism 63.

Figure 5:
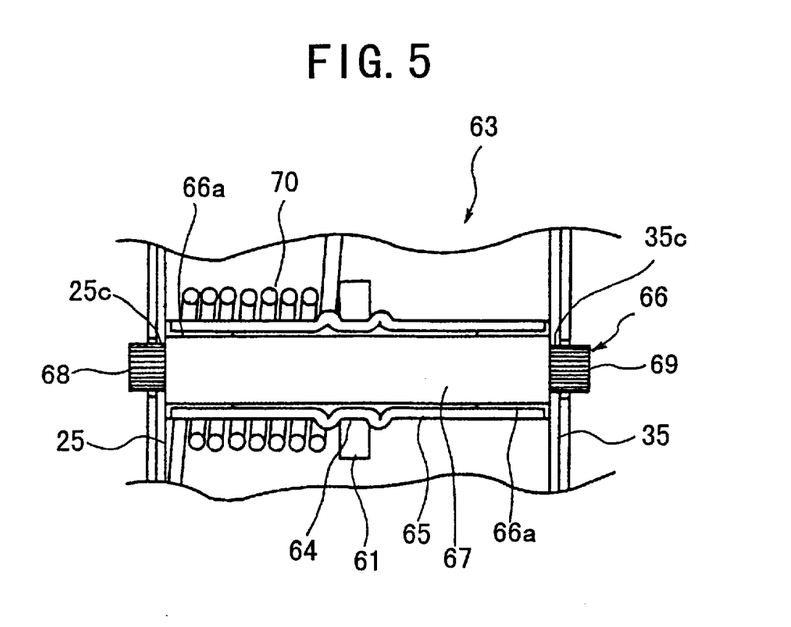
FIG. 5 is a cross section of a part shown in FIG. 3 cut along II—II.

FIGS. 3 and 5 show that the pedal supporting mechanism 63 contains a cylindrical boss 65, a shaft 66, and support holes 25c and 35c. The boss 65 is inserted into an installation hole 64 on an upper part of the pedal lever 61 and is caulked therewith. The shaft 66 contains a cylindrical axle 67 which is fit with the boss 65 via a sleeve 66a so as to rotate, and engaging parts 68 and 69 in the shape of columns are provided at both ends of the shaft 66 coaxially with the cylindrical axle 67. The engaging parts 68 and 69 have serrations on the peripheries. The engaging parts 68 and 69 have smaller diameter than the cylindrical axle 67, and the support holes 25c and 35c have smaller diameters than outer diameters of the engaging parts 68 and 69.

The shaft 66 is inserted into the boss 65, and the engaging parts 68 and 69 are pressed into the support holes 25c and 35c to firmly connect the engaging parts 68 and 69 with the pedal support portions 25 and 35. Thus, the top end of the pedal lever 61 is supported on the shaft 66 so as to pivot on the shaft 66.

Accordingly, the shaft 66 is firmly fixed to the pedal support portions 25 and 35, so that this simple structure eliminates the relative rotation between the pedal support portions 25 and 35 and the shaft 66. This is because the serrations bite into the support holes 25c and 35c. On the other hand, the engaging parts 68 and 69 are structured so as to be easily disconnected from the support holes 25c and 35c when the pedal support portions 25 and 35 are deformed by spreading apart from each other by the application of a large load.

Figure 6:
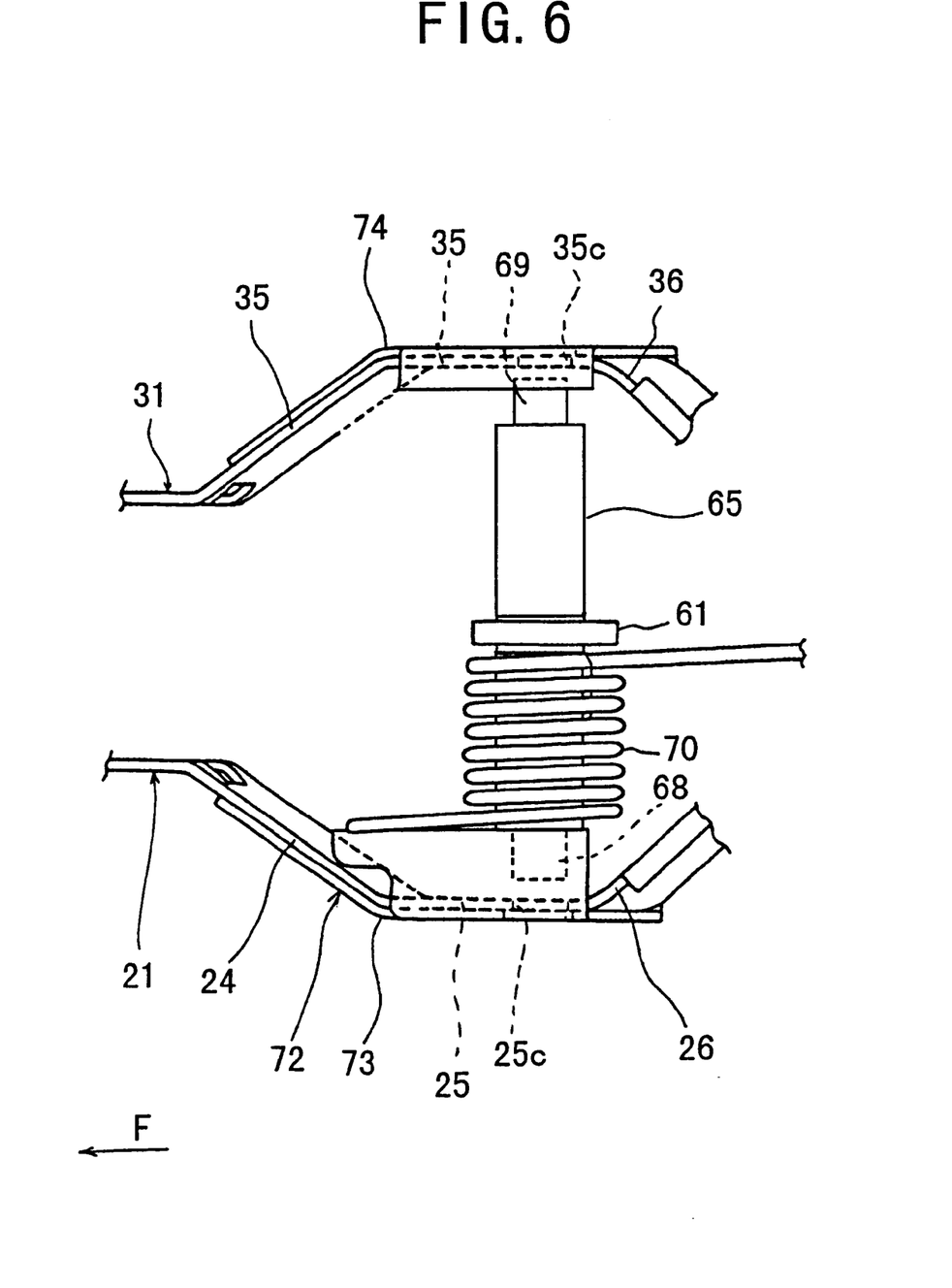
FIG. 6 is a diagram for explaining a function of the pedal support structure.
Figure 7:
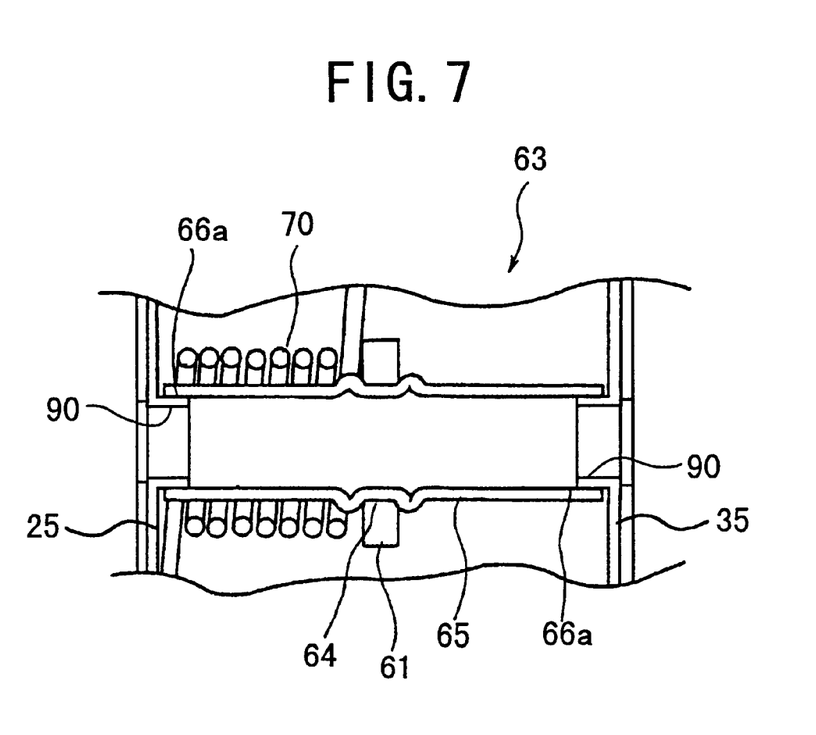
FIG. 7 is a cross section of the pedal axle supporting mechanism for explaining another embodiment.

A stopper bracket 72 is provided on the pedal bracket 10. As shown in FIGS. 2, 3 and 6, the stopper bracket 72 includes a pair of rigid parts 73 and 74 which extend on the lateral outer faces of the pedal support portions 25 and 35 and the front inclination portions 24 for restricting the deformation of the pedal support portions 25 and 35.

From the bottom ends of the rigid parts 73 and 74, extension parts 75 and 76 extend downwards. Bottom ends of the extension parts 75 and 76 are connected with each other via an installation plate 77. The installation plate 77 faces a stopper 71 having a L shaped cross section attached to the rear edge of the pedal lever 61. Furthermore, flanges 78 and 79 as provided on upper edges of the rigid parts 73 and 74 mainly at the rear parts. The flanges 78 and 79 are integral with the rigid parts 73 and 74 and are obtained by bending so as to cover the upper edge of the pedal support parts 25 and 35.

A return spring 70 is wound on the boss 65. Both ends of the return spring 70 engage with the flange 78 and the stopper 71. Thus, the brake pedal 60 is urged in a direction against the stepping force to be applied, i.e., toward the installation plate 77. Furthermore, the installation plate 77 has a lamp switch 81 thereon. When the installation plate 77 is brought in to contact with the stopper 71 by the suspension of braking operation, the pivotal movement of the brake pedal 61 is restricted. On the other hand, the stop lamp switch 81 makes a stop lamp by the stopper 71 detached from the stop lamp switch 81 turn on when breaking operation is performed.

As shown in FIG. 1, a master cylinder 82 is provided on the toe board 1 on the engine room E side. A pushrod 83 is protruded from the master cylinder 82 in a direction opposite to the engine room E. A free end of the pushrod 83 is connected to the pedal lever 61 by a clevis pin 84 to make a swing movement of the pushrod 83.

A concaved retaining part 85 is prepared on the rear end of the pedal lever 61 at a lower position than the connecting portion of the pedal lever 61 and the pushrod 83. The retaining part 85 is in the form of an L- or J-shaped notch prepared as a corner defined by both an introduction surface 85a which is gently curved and a retaining surface 85b located below the introduction surface 85a extending therefrom.

On the other hand, the catcher bracket 86 is provided on lower surfaces of the rear side support brackets 41 and 51.

A base end 86b of the catcher bracket 86 is firmly fixed to the lower surface of the rear side support brackets 41 and 51. The catcher bracket 86 has a sufficient rigidity and extends with inclination having a free end 86a located at a position lower than the base end 86b facing the concaved retaining part 85. The catcher bracket 86 is wider than the pedal lever 61 in a width direction of the automobile. It is preferable that the free end 86a is gently curved for smoothly engagement with the pedal lever 61.

In the brake pedal unit with the above structure, the upper end of the pedal lever 61 is supported on the pedal bracket 10. The front edge of the pedal bracket 10 is fixed to the toe board 1, the rear edge thereof is fixed to the steering support beam 5, and a center part is attached to the bulkhead 2. Thus, the brake pedal unit is attached to the vehicle body with maintaining a sufficient stiffness.

As mentioned previously, the stop lamp switch 81 is provided on the installation plate 77 of the stopper bracket 72. The brake pedal 60 is usually urged by the return spring 70, and is in a pressure contact with a stop lamp switch 81 without a braking operation. When the braking operation is carried out by a driver, a force is applied to the pedal pad 62 to move the pedal lever 61 around the shaft 66 in a front direction against the urging force of the return spring 70. The pedal lever 61 pushes the pushrod 83, and the force is transmitted to the master cylinder 82. After the master cylinder 82 amplifies the stepping force, the brake is applied. The stopper 71 is detached from the stop lamp switch 81 by the pivotal movement of the pedal lever 61 in a front direction with respect to the automobile body. Then, the stop lamp switch 81 makes the stop lamp turn on.

When the operator stops to apply a force to the brake pad 62, the brake pedal 60 makes a pivotal movement in a backward direction by the urging force of the return spring 70. Namely, the stopper 71 is brought into contact with the stop lamp switch 81 again. In this condition, the pushrod 83 is not pressed any more, and the braking operation has been stopped.

The pedal bracket 10 supporting the brake pedal 60 is firmly connected to three members, i.e., the toe board 1, the steering beam 5 and the bulkhead 2 to secure the installation firmness. Furthermore, the strength of the pedal bracket 10 at the pedal support portions 25 and 35 is increased by the application of rigid parts 73 and 74 thereto. In this way, the brake pedal 60 is firmly supported, and the braking operation can be comfortably performed in a stable condition.

When an external force exceeding a certain value is applied to the vehicle from the front side of the automobile, a power unit is pushed backward. Then, the power unit pushes the master cylinder 82 and the toe board 1 toward a passenger compartment R.

By the backward movement of members including the toe board 1, the front installation portions 23 and 33 of the pedal support brackets 21 and 31 are further pushed backward. However, the rear connecting portions 27 and 37 are supported on the rear side support brackets 41 and 51 which are connected to the steering support beam 5 by the support beam bracket 6. Therefore, the left and right brackets 21 and 31 are deformed when pushed backwards, by bending at the first bending lines 23a and 33a, and the second bending lines 24a and 34a usually without a substantial deformation of the front opposing portions 23 and 33. The front inclination portions 24 and 34 spread apart from each other mainly at the rear parts. Furthermore, the pedal support portions 25 and 35 also move backward, so that the rear inclination portions 26 and 36 also spread apart from each other by the bending deformation at the third bending lines 25a and 35a and the fourth bending lines 26a and 36a. In the deformation course, the distance between the pedal support portions 25 and 35 is increased. In this way, the opening deformation of the pedal support brackets 21 and 31 occurs when an excessive load is applied from the front side of the automobile.

By the above opening deformation of the pedal support brackets 21 and 31 including the movement of the pedal support portions 25 and 35 away from each other, the engaging parts 68 and 69 of the shaft 66 are gradually coming out of the support holes 25c and 35c. The engaging parts 68 and 69 do not suddenly loose the connection with the support holes 25c and 35c because of the serration connection therebetween. Namely, the pedal support structure of the present invention is so structured that the braking function by stepping the brake pedal 60 is not immediately lost upon the initiation of the opening deformation, but is maintained for a while.

When the pedal support brackets 21 and 31 are subjected to the opening deformation, the front parts of the rear inclination portions 26 and 36 move apart from each other by the bending deformation along the fourth bending lines 26a and 36a. The rear inclination portions 26 and 36 are adjacent to the rear connecting portions 27 and 37 supported on the rear side support brackets 41 and 51. According to the opening deformation of the rear inclination portions 26 and 36, the pedal support portions 25 and 35 are moved closer to the steering support beam 5. In other words, the pedal support portions 25 and 35 and the shaft 66 supported by the support holes 25c and 35c are backwardly shifted. By the backward movement of the shaft 66, the brake pedal 60 makes pivotal movement centering on the end of the pushrod 83 connected to the pedal lever 61. In this case, the pedal pad 62 does not move toward a passenger and is moved downwardly by the catcher bracket facing the pedal lever pressing the brake lever 61 to the front side of the automobile.

Accordingly, the backward movement (in a direction toward a passenger) of the pedal pad 62 and the brake pedal 60 can be eliminated, so that safety of a passenger is ensured. Moreover, the external energy is absorbed by the deformation of the front part of the vehicle body, whereby impact to the passenger can be decreased.

When an excessive external load is applied to the vehicle body from the front, the toe board 1 is further pushed into the passenger compartment, and the pedal lever is moved in a backward direction by the pushrod 83 protruded from the master cylinder 82 provided on the toe board 1. By this movement, the opening deformation of the pedal support brackets 21 and 31 further progresses, and the pedal support portions 25 and 35 separate from each other as shown in FIG. 6. As a result, the engaging parts 68 and 69 are detached from the support holes 25c and 35c, and the brake pedal 60 falls down.

After the detachment, the brake pedal 60 is supported only on an end of the pushrod 83. By the initial movement of the pedal lever 61 in the direction of a passenger compartment, the introduction surface 85a of the pedal lever 61 is brought into contact with the free end 86a of the catcher bracket 86. Then, the free end 86a slides on the introduction surface 85a. Finally, the free end 86a engages with the retaining surface 85b. The rigid catcher bracket 86 is bent to have the free end 86a facing downward by sliding on the surface 85a and pressing the pedal lever 61 downward. The catcher bracket 86 is deformed because the base end 86b thereof is firmly supported by the rear side support brackets 41 and 51.

As explained above, according to the pedal support structure of the present invention the brake pedal 60 is subjected to a pivotal movement centering on a connecting part of the brake pedal 60 and the pushrod 83 with maintaining the brake pad 62 at a lower position. Thus, the safety of the vehicle is improved which has the pedal support structure of the present invention because the backward movement, since the movement of the pedal pad 62 in the direction to the passenger compartment is restricted.

The bolt holes 44a and 54a on the bulkhead connecting portions 44 and 54 or a bolt hole (not shown) on a bulkhead bracket 3, or the both can be formed in the shape of an oval with a longer axis in a lengthwise direction of the vehicle. The bolt holes in the shape of ovals make the relative movement possible between the rear side support brackets 41 and 51 and the bulkhead bracket 3. The applied load is partially absorbed by the brackets 41 and 51 and the bracket 3 by the sliding motion therebetween. Therefore, the load is decreased in the transmission course from the pedal support brackets 21 and 31 to the steering support beam 5. As a result of the load transmission, the pedal support brackets 21 and 31 are subjected to the above-mentioned opening deformation and hence the brake pedal 60 falls off in a suitable way. The bulkhead 2 is not affected by the deformation, so that it is possible to prevent the bulkhead 2 from being deformed.

The rear connecting portions 27 and 37 of the pedal support brackets 21 and 31 are superimposed with the front parts of the base parts 42 and 52 included in rear side support brackets 41 and 51 in such a fashion that the rear connecting portions 27 and 37 covers the front part of the base parts 42 and 52 from the outer sides. The rear connecting portions 27 and 37 are connected with the base parts 42 and 52 by the bolts 57 and the nuts 58. Consequently, the pedal support brackets 21 and 31 are firmly connected with the rear side support brackets 41 and 51. At the same time, it is possible to exchange only a part of the pedal bracket 10 such as the pedal support brackets 21 and 31 or the rear side support brackets 41 and 51 when some repair is necessary.

In the above embodiments, the support structure for the brake pedal was mainly explained. However, the support structure can be used also for a clutch pedal.

Furthermore, in the above embodiment, the pedal lever 61 conducts a pivotal movement by the support on the shaft 66 contained in the boss 65 with the engaging parts 68 and 69 with serration squeezed into the support holes 25c and 35c. Alternatively, as shown in FIG. 8, it is possible to prepare cylindrical axis members 90 protruded from the pedal support portions 25 and 35. Both ends of the boss 65 are fit with the cylindrical members 90 without using the shaft 66. In this case, the pedal lever 61 is supported on the boss 65.

Moreover, the catcher bracket 86 can also be attached to members other than the rear side support brackets 41 and 51. For instance, it is possible to directly provide the catcher bracket 86 on the steering support beam 5 via a bracket. It is also possible that the catcher bracket 86 is formed by a bar with a sufficient diameter which is bent to have an appropriate shape.

By using the pedal support structure for a vehicle according to the present invention, the safety of a passenger in the vehicle is improved especially when an external force is applied to the vehicle from the front. This is because that the pedal support bracket for use in the present invention is subjected to opening deformation when the force is applied from the front, and that the linkage of the pedal only with the end of the pushrod is maintained. As mentioned previously, the pedal in such a condition pivots around the pushrod by the rear end of the pedal lever. Therefore, the pedal lever does not move to a position close to the passenger by the aid of the catcher bracket.

The present invention being thus described, it will be clearly understood that the same may be varied in many ways. Such variations are not to be regarded as a departure from the spirit and scope of the present invention, and all such modification as would be easily understood to one skilled in the art are intended to be included within the scope of the appended claims.

What is claimed is:

1. A pedal support structure for a vehicle comprising:
    a toe board for separating an engine compartment from a passenger compartment;
    a steering support beam protruded from said toe board for supporting a steering shaft;
    a pedal lever with a first end and a second end;
    a master cylinder connected with said toe board;
    a pushrod extending from said master cylinder and having an end connected to said pedal lever;
    a pair of pedal support elements including pedal support portions opposing each other and extending in a lengthwise direction of a vehicle body, said pedal support element having a first end connected to said toe board and a second end connected to said steering support beam;
    a supporting mechanism provided between said pedal support portions for supporting said first end of said pedal lever thereon so as to permit pivotal movement of said pedal lever; and
    a catcher bracket having a free end facing said pedal lever so as to disconnect said pedal lever from said supporting mechanism when a force is applied to said vehicle.

2. The pedal support structure as claimed in claim 1, wherein said pedal support elements successively comprise:
    installation portions connected to said toe board;
    opposing portions opposing each other and extending from said installation portions;
    first inclination portions extending from said opposing portions; said pedal support portions extending from said first inclination portions;
    second inclination portions extending from said pedal support portions; and
    connecting portions extending from said second inclination portions, said first inclination portions gradually having a longer distance from each other towards said pedal support portions and said second inclination portions gradually having a shorter distance from each other towards said connecting portions.

3. The pedal support structure as claimed in claim 1, wherein said supporting mechanism comprises:
    a shaft having engaging parts provided with serrations at both ends; said pedal support portions having supporting holes; said engaging parts pressed into said supporting holes and said first end of said pedal lever supported on said shaft so as to rotate therearound.

4. The pedal support structure as claimed in claim 1, wherein said catcher bracket has another end connected to said pedal bracket, said free end of said catcher bracket contacting said pedal lever when said pedal lever is detached, and said free end moveable downwardly to push said pedal lever in a downward direction.

5. The pedal support structure as claimed in claim 1, wherein said pedal lever has a concave part at said second end which is engageable with said free end of said catcher bracket.

6. The pedal support structure as claimed in claim 1, further comprising rigid support brackets having a rigidity greater than said pedal support elements, said pedal support elements connected to said steering support beam by said rigid support brackets, and said another end of said catcher bracket fixed on said rigid support brackets.

7. The pedal support structure as claimed in claim 6, further comprising a bulkhead extending from an upper end of said toe board, a bulkhead bracket provided on said bulkhead, said bulkhead bracket having a bolt hole therein, said rigid support brackets having a bolt hole therein, said bulkhead bracket and said rigid support brackets connected by a bolt through said bolt hole in said rigid support bracket and said bolt hole in said bulkhead bracket, at least one of said bolt hole in said bulkhead and said bolt hole in said rigid support bracket having an oval shape with a longer axis in a lengthwise direction of the vehicle body.

* * * * *